United States Patent
Yamashita et al.

(10) Patent No.: US 11,390,751 B2
(45) Date of Patent: Jul. 19, 2022

(54) POLYCARBODIIMIDE COMPOSITION, METHOD FOR PRODUCING A POLYCARBODIIMIDE COMPOSITION, WATER-DISPERSED COMPOSITION, SOLUTION COMPOSITION, RESIN COMPOSITION, AND CURED RESIN

(71) Applicant: MITSUI CHEMICALS, INC., Tokyo (JP)

(72) Inventors: Tatsuya Yamashita, Ichihara (JP); Toshihiko Nakagawa, Ichihara (JP); Shinji Kiyono, Kimitsu (JP); Kazuki Sakata, Chiba (JP); Hirokazu Morita, Chiba (JP); Shigeru Mio, Chiba (JP); Satoshi Yamasaki, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 436 days.

(21) Appl. No.: 16/485,811

(22) PCT Filed: Jun. 20, 2017

(86) PCT No.: PCT/JP2017/022711
§ 371 (c)(1),
(2) Date: Aug. 14, 2019

(87) PCT Pub. No.: WO2018/150601
PCT Pub. Date: Aug. 23, 2018

(65) Prior Publication Data
US 2020/0048467 A1    Feb. 13, 2020

(30) Foreign Application Priority Data

Feb. 16, 2017  (JP) .............................. JP2017-027097

(51) Int. Cl.
| | |
|---|---|
| *C08L 101/06* | (2006.01) |
| *C08G 18/02* | (2006.01) |
| *C08G 18/80* | (2006.01) |
| *C08L 101/02* | (2006.01) |
| *C08G 18/28* | (2006.01) |
| *C08G 18/09* | (2006.01) |
| *C08K 5/29* | (2006.01) |
| *C08L 79/00* | (2006.01) |
| *C08G 18/73* | (2006.01) |
| *C08L 75/04* | (2006.01) |
| *C08L 101/08* | (2006.01) |
| *C08J 3/03* | (2006.01) |

(52) U.S. Cl.
CPC .......... *C08L 101/06* (2013.01); *C08G 18/025* (2013.01); *C08G 18/09* (2013.01); *C08G 18/095* (2013.01); *C08G 18/28* (2013.01); *C08G 18/282* (2013.01); *C08G 18/283* (2013.01); *C08G 18/73* (2013.01); *C08G 18/8022* (2013.01); *C08J 3/03* (2013.01); *C08K 5/29* (2013.01); *C08L 75/04* (2013.01); *C08L 79/00* (2013.01); *C08L 101/025* (2013.01); *C08L 101/08* (2013.01); *C08G 2115/06* (2021.01)

(58) Field of Classification Search
CPC .... C08L 101/06; C08L 101/025; C08L 79/00; C08L 101/08; C08L 75/04; C08G 18/025; C08G 18/8022; C08G 2115/06; C08G 18/282; C08G 18/09; C08G 18/095; C08G 18/28; C08G 18/283; C08G 18/73; C08K 5/29; C08J 3/03
See application file for complete search history.

(56) References Cited

U.S. PATENT DOCUMENTS

| | | | |
|---|---|---|---|
| 2,853,473 | A | 9/1958 | Campbell |
| 6,124,398 | A | 9/2000 | Imashiro |
| 6,248,819 | B1 | 6/2001 | Masuda |
| 2013/0144006 | A1 | 6/2013 | Derksen |
| 2017/0190916 | A1 | 7/2017 | Isaji |
| 2018/0010024 | A1* | 1/2018 | Lu .............................. C09J 7/38 |
| 2018/0148533 | A1 | 5/2018 | Yamashita |

FOREIGN PATENT DOCUMENTS

| | | |
|---|---|---|
| EP | 0878496 B1 | 8/2004 |
| EP | 0952146 B1 | 8/2006 |
| JP | H1095830 A | 4/1998 |
| JP | H10316930 A | 12/1998 |
| JP | 200111152 A | 1/2001 |
| JP | 200515734 A | 1/2005 |
| JP | 3630527 B2 | 3/2005 |
| JP | 3715464 B2 | 11/2005 |
| JP | 200670186 A | 3/2006 |
| JP | 200996960 A | 5/2009 |
| JP | 2010159339 A | 7/2010 |
| JP | 201194102 A | 5/2011 |
| JP | 2013538795 A | 10/2013 |
| WO | 2008087898 A | 7/2008 |
| WO | 2016021688 A1 | 2/2016 |
| WO | 2017119443 A1 | 7/2017 |

OTHER PUBLICATIONS

PCT International Preliminary Report on Patentability (Form PCT/IB/373) filed in PCT/JP2017/022711, with PCT Notification Concerning Transmittal of International Preliminary Report on Patentability (Form PCT/IB/326) dated Aug. 29, 2019.
PCT International Preliminary Report on Patentability (Form PCT/IB/373) filed in PCT/JP2017/020711, with PCT Notification of Transmittal of Translation of the International Preliminary Report on Patentability (Form PCT/IB/338) dated Aug. 29, 2019.

(Continued)

*Primary Examiner* — Rabon A Sergent
(74) *Attorney, Agent, or Firm* — Rankin, Hill & Clark LLP

(57) ABSTRACT

The polycarbodiimide composition is a reaction product of polyisocyanate having a primary isocyanate group with alcohol, wherein the alcohol contains at least one oxyethylene-containing alcohol containing an oxyethylene group, and at least one oxyethylene-noncontaining alcohol containing no oxyethylene group, the at least one oxyethylene-noncontaining alcohol has a solubility parameter of 11.20 $(cal/cm^3)^{1/2}$ or less.

10 Claims, No Drawings

(56) References Cited

OTHER PUBLICATIONS

Extended European Search Report dated Dec. 8, 2020 issued in the corresponding European Patent Application No. 17896928.3.
R. Fedors, "A Method for Estimating Both the Solubility Parameters and Molar Volumes for Liquids," Polymer Engineering and Science, Feb. 1974, pp. 147-154, vol. 14 No. 2, National Aeronautics and Space Administration, USA.
International Search Report dated Sep. 26, 2017 filed in PCT/JP2017/022711.

* cited by examiner

POLYCARBODIIMIDE COMPOSITION, METHOD FOR PRODUCING A POLYCARBODIIMIDE COMPOSITION, WATER-DISPERSED COMPOSITION, SOLUTION COMPOSITION, RESIN COMPOSITION, AND CURED RESIN

TECHNICAL FIELD

The present invention relates to a polycarbodiimide composition, method for producing a polycarbodiimide composition, water-dispersed composition, solution composition, resin composition, and cured resin.

BACKGROUND ART

Conventionally, in the field of paint materials, adhesives, and coating agent, a resin composition containing a main component and a curing agent has been known, and for the curing agent, for example, a carbodiimide curing agent has been known.

To be more specific, for the carbodiimide curing agent, Patent Document 1 proposed a polycarbodiimide compound produced by allowing 673 g of hexamethylene diisocyanate (HDI) to react with 800 g of polyethyleneglycol monomethyl ether having an average molecular weight of 400 at 120° C. for 1 hour, adding 13.5 g of a carbodiimide catalyst (3-methyl-1-phenyl-2-phospholene-1-oxide), and allowing the mixture to further react at 185° C. for 5 hours (for example, see Patent Document 1 below (Synthesis Example 82)).

Then, such a resin composition composed of the polycarbodiimide compound (curing agent) and main component is dried and cured, to obtain a cured resin such as coating.

CITATION LIST

Patent Document

Patent Document 1: Japanese Unexamined Patent Publication No. H10-316930

SUMMARY OF THE INVENTION

Problem to be Solved by the Invention

Meanwhile, the above-described polycarbodiimide compound may not have sufficient storage stability, and its flowability may be reduced or it may be solidified by undergoing storage.

For the cured resin produced by using the polycarbodiimide compound such as coating, various physical properties such as film-forming characteristics, water resistance, and chemical resistance are required.

The present invention includes a polycarbodiimide composition that allows for production of a cured resin with excellent storage stability, and also excellent film-forming characteristics, water resistance, and chemical resistance; a method for producing the polycarbodiimide composition; water-dispersed composition and a solution composition containing the polycarbodiimide composition: a resin composition containing the polycarbodiimide composition, and also a cured resin produced by curing the resin composition.

Means for Solving the Problem

The present invention [1] includes a polycarbodiimide composition of a reaction product of polyisocyanate having a primary isocyanate group with alcohol, wherein the alcohol contains at least one oxyethylene-containing alcohol containing an oxyethylene group, and at least one oxyethylene-noncontaining alcohol containing no oxyethylene group, the at least one oxyethylene-noncontaining alcohol has a solubility parameter of 11.20 $(cal/cm^3)^{1/2}$ or less.

The present invention [2] includes the polycarbodiimide composition described in [1] above, wherein the oxyethylene group content relative to the polycarbodiimide composition is 10 mass % or more and 35 mass % or less.

The present invention [3] includes the polycarbodiimide composition described in [1] or [2] above, wherein the oxyethylene-noncontaining alcohol having the solubility parameter of 11.20 $(cal/cm^3)^{1/2}$ or less is primary alcohol and/or secondary alcohol.

The present invention [4] includes the polycarbodiimide composition described in any one of the above-described [1] to [3], wherein the oxyethylene-noncontaining alcohol having the solubility parameter of 11.20 $(cal/cm^3)^{1/2}$ or less is monohydric alcohol with 4 or more and 12 or less carbon atoms.

The present invention [5] includes the polycarbodiimide composition described in any one of the above-described [1] to [4], wherein the oxyethylene-noncontaining alcohol having the solubility parameter of 11.20 $(cal/cm^3)^{1/2}$ or less is at least one selected from the group consisting of isobutanol, 2-butanol, 2-methyl-1-butanol, 2,2-dimethyl-1-propanol, 3-methoxy-1-butanol, 1-octanol, 2-ethyl-1-hexanol, and 1-dodecanol.

The present invention [6] includes the polycarbodiimide composition described in any one of the above-described [1] to [5], wherein the polyisocyanate is an aliphatic polyisocyanate.

The present invention [7] includes the polycarbodiimide composition described in any one of the above-described [1] to 161, wherein the polyisocyanate is pentamethylene diisocyanate.

The present invention 181 includes a method for producing a polycarbodiimide composition, the method including the steps of: a urethane-forming step, in which polyisocyanate having a primary isocyanate group and alcohol are subjected to urethane-forming reaction, and a carbodiimide-forming step, in which the reaction product in the urethane-forming step is heated in the presence of a carbodiimide-forming catalyst to cause carbodiimide-forming reaction, wherein the alcohol contains at least one oxyethylene-containing alcohol containing an oxyethylene group and at least one oxyethylene-noncontaining alcohol containing no oxyethylene group, and the at least one oxyethylene-noncontaining alcohol has a solubility parameter of 11.20 $(cal/cm^3)^{1/2}$ or less.

The present invention [9] includes the method for producing a polycarbodiimide composition described in [8] above, wherein the equivalent ratio (NCO/OH) of the isocyanate group in the polyisocyanate relative to the hydroxyl group in the alcohol is more than 2 and 10 or less.

The present invention [10] includes a water-dispersed composition, the water-dispersed composition being an aqueous dispersion in which the polycarbodiimide composition described in any one of the above-described [1] to [7] is dispersed in water with a solid content concentration of 5 mass % or more and 90 mass % or less.

The present invention [11] includes a solution composition, the solution composition being a solution in which the polycarbodiimide composition described in any one of the above-described [1] to [7] is dissolved in an organic solvent with a solid content concentration of 5 mass % or more and 90 mass % or less.

The present invention [12] includes a resin composition including a main component having a carboxyl group, and a curing agent containing the polycarbodiimide composition described in any one of the above-described [1] to [7].

The present invention [13] includes a cured resin, the cured resin being a cured product of the resin composition described in [12] above.

Effects of the Invention

The polycarbodiimide composition of the present invention is a reaction product of polyisocyanate having a primary isocyanate group and alcohol containing at least one oxyethylene-containing alcohol and at least one oxyethylene-noncontaining alcohol, and at least one oxyethylene-noncontaining alcohol has a solubility parameter of the above-described predetermined value or less.

Therefore, the polycarbodiimide composition of the present invention, water-dispersed composition of the present invention and solution composition of the present invention containing the polycarbodiimide composition, and resin composition of the present invention containing the polycarbodiimide composition have excellent storage stability, and the cured resin with excellent film-forming characteristics, water resistance, and chemical resistance can be produced.

Furthermore, with the method for producing a polycarbodiimide composition of the present invention, the polycarbodiimide composition of the present invention can be produced efficiently.

The cured resin of the present invention has excellent film-forming characteristics, water resistance, and chemical resistance.

DESCRIPTION OF THE EMBODIMENTS

The polycarbodiimide composition of the present invention is a reaction product of polyisocyanate having a primary isocyanate group (in the following, may be simply referred to as polyisocyanate) with alcohols.

The primary isocyanate group is defined as a monofunctional group (—CH$_2$NCO) in which two hydrogen atoms (H) are bonded to the carbon atom (C) to which the isocyanate group (—NCO) is bonded.

The polyisocyanate having a primary isocyanate group can be those having at least one primary isocyanate group, and for example, it can have a secondary isocyanate group or tertiary isocyanate group.

The secondary isocyanate group is defined as a difunctional group (—CHR—NCO (R represents a substituent)) in which one hydrogen atom (H) is bonded to the carbon atom (C) to which the isocyanate group (—NCO) is bonded.

The tertiary isocyanate group is defined as a trifunctional group (—CR$_1$R$_2$—NCO (R$_1$ and R$_2$ represent the same or different substituent)) in which no hydrogen atom (H) is bonded to the carbon atom (C) to which the isocyanate group (—NCO) is bonded.

Examples of the polyisocyanate having a primary isocyanate group include aliphatic polyisocyanate having a primary isocyanate group, alicyclic polyisocyanate having a primary isocyanate group, and araliphatic polyisocyanate having a primary isocyanate group.

The aliphatic polyisocyanate having a primary isocyanate group is an open-chain (straight chain or branched open-chain; noncyclic) aliphatic polyisocyanate having a primary isocyanate group, and examples thereof include aliphatic diisocyanates such as ethylenediisocyanate, trimethylenediisocyanate, 1,2-propylenediisocyanate, butylenediisocyanate (tetramethylenediisocyanate, 1,2-butylenediisocyanate, 2,3-butylenediisocyanate, 1,3-butylenediisocyanate), 1,5-pentamethylene diisocyanate (PDI), 1,6-hexamethylene diisocyanate (HDI), 2,4,4- or 2,2,4-trimethylhexamethylene diisocyanate, 2,6-diisocyanatemethylcaproate, heptamethylenediisocyanate, octamethylenediisocyanate, and dodecamethylenediisocyanate.

Examples of the alicyclic polyisocyanate having a primary isocyanate group include alicyclic diisocyanates such as 3-isocyanatomethyl-3,5,5-trimethylcyclohexylisocyanate (isophoronediisocyanate; IPDI), 1,3- or 1,4-bis(isocyanatomethyl) cyclohexane or a mixture thereof (hydrogenated XDI), and norbornane diisocyanate (NBDI).

Examples of the araliphatic polyisocyanate having a primary isocyanate group include araliphatic diisocyanates such as 1.3- or 1,4-xylylenediisocyanate or a mixture thereof (XDI).

These polyisocyanates having a primary isocyanate group can be used singly, or can be used in combination of two or more.

For the polyisocyanate having a primary isocyanate group, in view of light resistance, handling properties, and water dispersiveness, preferably, aliphatic polyisocyanate having a primary isocyanate group and alicyclic polyisocyanate having a primary isocyanate group are used, and in view of chemical resistance, more preferably, aliphatic polyisocyanate having a primary isocyanate group is used.

For the aliphatic polyisocyanate having a primary isocyanate group, in view of availability, preferably, 1,5-pentamethylene diisocyanate (PDI) and 1,6-hexamethylene diisocyanate (HDI) are used, more preferably 1,5-pentamethylene diisocyanate (PDI) is used.

The 1,5-pentamethylene diisocyanate has a fewer carbon atoms compared with 1,6-hexamethylene diisocyanate, and a smaller molecular weight. Therefore, when polycarbodiimide compositions having the same molecular weight are to be produced, use of 1,5-pentamethylene diisocyanate allows for a higher carbodiimide group concentration in the polycarbodiimide composition compared with the case where 1,6-hexamethylene diisocyanate is used. As a result, a cured resin (described later) with various excellent physical properties (water resistance, chemical resistance, etc.) can be produced. Furthermore, 1,5-pentamethylene diisocyanate, which has carbon atoms of an odd number, has low crystallinity based on its non-crystal structure from the odd carbon atoms compared with 1,6-hexamethylene diisocyanate with even number of carbon atoms, and therefore it has excellent handling properties and dispersiveness, and physical properties of the produced cured resin (described later) can be improved.

Furthermore, use of 1,5-pentamethylene diisocyanate easily cause thermal decomposition of the uretonimine group to be described later compared with the case where 1,6-hexamethylene diisocyanate is used, and therefore, the polycarbodiimide composition can be produced with excellent yield. Furthermore, it can be handled under low temperature, and therefore a high molecular weight uretonimine can be suppressed.

The alcohols contain alcohol (in the following, referred to as oxyethylene-containing alcohol) containing an oxyethylene group in its molecule, and alcohol (in the following, referred to as oxyethylene-noncontaining alcohol) containing no oxyethylene group in its molecule. To be more specific, it contains at least one oxyethylene-containing alcohol and at least one oxyethylene-noncontaining alcohol.

The oxyethylene group (—$CH_2CH_2O$—) is a group composed of two carbon atoms, four hydrogen atoms, and one oxygen atom.

That is, the oxyethylene group (—$CH_2CH_2O$—) is distinguished from those having one or more hydrogen atoms substituted by other atomic group (for example, oxypropylene group (—$CH(CH_3)CH_2O$—), etc.).

The oxyethylene group (—$CH_2CH_2O$—) is also distinguished from those having its terminal carbon atoms bonded to hydrogen atom or hydrocarbon group (for example, ethylether group (H—$CH_2CH_2O$—), propylether group ($CH_3$—$CH_2CH_2O$—), etc.).

The oxyethylene-containing alcohol is defined as those alcohols having such an oxyethylene group (—$CH_2CH_2O$—) structure in its molecule.

The oxyethylene-noncontaining alcohol is defined as those alcohols having no oxyethylene group (—$CH_2CH_2O$—) structure in its molecule.

Examples of the oxyethylene-containing alcohol include polyol containing an oxyethylene group in its molecule (in the following, referred to as oxyethylene-containing polyol) and monol containing an oxyethylene group in its molecule (in the following, referred to as oxyethylene-containing monol).

The oxyethylene-containing polyol is an organic compound having both one or more oxyethylene groups and two or more hydroxyl groups in one molecule, and examples thereof include oxyethylene-containing polymer polyol such as polyoxyethylene polyol, and polyoxyethylene-polyoxypropylene (random and/or block) copolymer.

Polyoxyethylene polyol can be produced by, for example, addition reaction of ethylene oxide using a low molecular-weight polyol as an initiator. The polyoxyethylene-polyoxypropylene copolymer can be produced by, for example, subjecting ethylene oxide and propylene oxide to addition reaction using a low molecular-weight polyol as an initiator.

The low molecular-weight polyol is a compound having two or more hydroxyl groups and having a molecular weight of 60 or more and less than 500, and examples thereof include dihydric alcohols such as ethylene glycol, propylene glycol, 1,3-propanediol, 1,4-butyleneglycol, 1,3-butyleneglycol, 1,2-butyleneglycol, 1,5-pentanediol, 1,6-hexanediol, neopentyl glycol, 3-methyl-1,5-pentanediol, 2,2,2-trimethylpentanediol, 3,3-dimethylolheptane, alkane (C7 to 20) diol, 1,3- or 1,4-cyclohexanedimethanol and a mixture thereof, 1,3- or 1,4-cyclohexanediol and a mixture thereof, hydrogenated bisphenol A, 1,4-dihydroxy-2-butene, 2,6-dimethyl-1-octene-3,8-diol, bisphenol A, diethylene glycol, triethylene glycol, and dipropylene glycol; trihydric alcohols such as glycerine, trimethylolpropane, and triisopropanolamine; tetrahydric alcohols such as tetramethylolmethane (pentaerythritol) and diglycerol; pentahydric alcohols such as xylitol; hexahydric alcohols such as sorbitol, mannitol, allitol, iditol, dulcitol, altritol, inositol, and dipentaerythritol: heptahydric alcohols such as perseitol; and octahydric alcohols such as sucrose. These can be used singly, or can be used in combination of two or more.

For the low molecular-weight polyol, preferably, dihydric alcohol is used.

These low molecular-weight polyols can be subjected to addition reaction with ethylene oxide (and propyleneoxide) by, without particular limitation, a known method.

The functionality (hydroxyl group number) of the polyoxyethylene polyol is the same as the functionality (hydroxyl group number) of the initiator (low molecular-weight polyol, etc.), and for example, when dihydric alcohol is used as the initiator, polyoxyethylene glycol is produced as the polyoxyethylene polyol. The functionality (hydroxyl group number) of the polyoxyethylene-polyoxypropylene (random and/or block) copolymer is the same as the functionality (hydroxyl group number) of the initiator (low molecular-weight polyol, etc.), and for example, when dihydric alcohol is used as the initiator, dihydric polyoxyethylene-polyoxypropylene copolymer is produced as the polyoxyethylene-polyoxypropylene copolymer.

The oxyethylene-containing polyol is not limited to the above-described oxyethylene-containing polymerpolyol, as long as the one or more oxyethylene group and two or more hydroxyl group are contained in one molecule, and for example, oxyethylene-containing monomer polyol such as ethylene glycol (HO—$CH_2CH_2$—OH) and diethylene glycol (HO—$CH_2CH_2$—O—$CH_2CH_2$—OH) can also be used.

When the oxyethylene-containing polyol contains two or more oxyethylene groups, these oxyethylene groups may or may not be continuous. In other words, when the oxyethylene-containing polyol contains two or more oxyethylene groups, another group (for example, oxypropylene group, etc.) can be interposed between these oxyethylene groups, or no group can be interposed therebetween.

These oxyethylene-containing polyols may be used singly or in a combination of two or more.

For the oxyethylene-containing polyol, preferably, oxyethylene-containing polymer polyol is used.

For the oxyethylene-containing polyol, preferably, polyol containing two or more continuous oxyethylene groups in its molecule, more preferably, polyol containing three or more continuous oxyethylene groups in its molecule, even more preferably, polyoxyethylene glycol containing three or more continuous oxyethylene groups is used.

The oxyethylene-containing monol is an organic compound having one or more oxyethylene group and one hydroxyl group in one molecule, and for example, oxyethylene-containing polymer monol such as one-end capped polyoxyethylene glycol is used.

The one-end capped polyoxyethylene glycol is polyethylene glycol monoalkylether in which one terminal hydroxyl group of polyoxyethylene glycol is substituted by an oxyalkylene group.

In the polyethylene glycol monoalkylether, the alkyl group has carbon atoms of 1 or more, and for example, 20 or less, preferably 8 or less, more preferably 6 or less, even more preferably 4 or less, particularly preferably 2 or less. That is, for the alkyl group capping the one terminal, a methyl group, and an ethyl group are used. For these polyethylene glycol monoalkylether, to be specific, polyethyleneglycol monomethyl ether, and polyethylene glycol monoethylether are used.

The oxyethylene-containing monol is not limited to the above-described oxyethylene-containing polymer monol as long as it contains one or more oxyethylene group and one hydroxyl group in one molecule, the oxyethylene-containing monomer monol can also be used. Examples of the oxyethylene-containing monomer monol include primary alcohols such as 2-methoxyethanol ($CH_3O$—$CH_2CH_2$—OH), 2-ethoxyethanol ($CH_3CH_2O$—$CH_2CH_2$—OH), and diethylene glycol monoethylether (also called: carbitol) ($CH_3O$—$CH_2CH_2$—O—$CH_2CH_2$—OH).

When the oxyethylene-containing monol contains two or more oxyethylene groups, these oxyethylene groups may or may not be continuous. In other words, when the oxyethylene-containing monol contains two or more oxyethylene groups, another group (for example, oxypropylene group, etc.) can be interposed therebetween, or no interposition may take place between these oxyethylene groups.

These oxyethylene-containing monols may be used singly or in a combination of two or more.

These oxyethylene-containing alcohols may be used singly or in a combination of two or more.

For the oxyethylene-containing alcohol, preferably, oxyethylene-containing monol, more preferably, oxyethylene-containing polymer monol, even more preferably, polyethylene glycol monoalkylether, particularly preferably, polyethyleneglycol monomethyl ether is used.

When the oxyethylene-containing alcohol has a repeating unit of oxyethylene group, the repeating unit number is, for example, 2 or more, preferably 3 or more, more preferably 5 or more, even more preferably 10 or more, and for example, 60 or less, preferably 50 or less.

When the repeating unit number of the oxyethylene group is within the above-described range, stability during synthesis and water dispersiveness of the polycarbodiimide composition can be improved.

The oxyethylene-containing alcohol has a molecular weight (number average molecular weight) of, for example, 100 or more, preferably 200 or more, more preferably 300 or more, even more preferably 400 or more, and for example, 5000 or less, preferably 3000 or less, more preferably 2000 or less, even more preferably 1000 or less.

When the oxyethylene-containing alcohol has a molecular weight (number average molecular weight) within the above-described range, stability during synthesis and water dispersiveness of the polycarbodiimide composition can be improved.

The oxyethylene-noncontaining alcohol is alcohol excluding the above-described oxyethylene-containing alcohol, and to be specific, alcohol containing no oxyethylene group in its molecule.

The oxyethylene-noncontaining alcohol contains at least one of oxyethylene-noncontaining alcohol (in the following, referred to as low SP oxyethylene-noncontaining alcohol) having a solubility parameter (Solubility Parameter: SP value) of 11.20 $(cal/cm^3)^{1/2}$ or less.

In other words, in the present invention, for the oxyethylene-noncontaining alcohol, at least one of alcohol having a solubility parameter (SP value) of 11.20 $(cal/cm^3)^{1/2}$ or less is selected.

For the solubility parameter (SP value), the value calculated based on the method described in Fedors method (Polymer Engineering and Science, February, 1974, Vol. 14, No. 2 P. 147 to 154 (A Method for Estimating Both the Solubility Parameters and Molar Volumes of Liquids)) is used.

For such a low SP oxyethylene-noncontaining alcohol, to be specific, oxyethylene-noncontaining polyol containing no oxyethylene group in its molecule (in the following, referred to as low SP oxyethylene-noncontaining polyol), monol containing no oxyethylene group in its molecule (in the following, referred to as low SP oxyethylene-noncontaining monol) are used, and preferably, low SP oxyethylene-noncontaining monol is used.

The low SP oxyethylene-noncontaining monol is alcohol having no oxyethylene group in one molecule and having one hydroxyl group in one molecule, and for example, the following can be used: primary alcohols such as isobutanol (SP value 11.11 $(cal/cm^3)^{1/2}$), 2-butanol (SP value 11.11 $(cal/cm^3)^{1/2}$), 2-methyl-1-butanol (SP value 10.77 $(cal/cm^3)^{1/2}$), 3-methoxy-1-butanol (SP value 10.92 $(cal/cm^3)^{1/2}$), 1-pentanol (SP value 10.96 $(cal/cm^3)^{1/2}$), 2,2-dimethyl-1-propanol (also called: neopentyl alcohol) (SP value 10.58 $(cal/cm^3)^{1/2}$), 1-hexanol (SP value 10.68 $(cal/cm^3)^{1/2}$), 1-heptanol (SP value 10.46 $(cal/cm^3)^{1/2}$), 1-octanol (SP value 10.28 $(cal/cm^3)^{1/2}$), 2-ethyl-1-hexanol (SP value 10.14 $(cal/cm^3)^{1/2}$), 1-dodecanol (SP value 9.81 $(cal/cm^3)^{1/2}$), and 1-octadecanol (SP value 9.45 $(cal/cm^3)^{1/2}$); secondary alcohols such as dipropylene glycol monomethylether (SP value 10.42 $(cal/cm^3)^{1/2}$), tripropylene glycol monomethylether (SP value 9.99 $(cal/cm^3)^{1/2}$), cyclooctanol (SP value 10.93 $(cal/cm^3)^{1/2}$): and tertiary alcohols such as tert-butanol (SP value 10.90 $(cal/cm^3)^{1/2}$) are used. These low SP oxyethylene-noncontaining monols can be used singly, or can be used in combination of two or more.

The low SP oxyethylene-noncontaining alcohol can be used singly, or can be used in combination of two or more.

The low SP oxyethylene-noncontaining alcohol preferably contains low SP oxyethylene-noncontaining monol. The low SP oxyethylene-noncontaining monol content relative to a total amount of the oxyethylene-noncontaining alcohol is, for example, 25 mass % or more, preferably 50 mass % or more, and for example, 100) mass % or less.

For the low SP oxyethylene-noncontaining alcohol, preferably, primary alcohol or secondary alcohol is used.

When the low SP oxyethylene-noncontaining alcohol is primary alcohol and/or secondary alcohol (in other words, when it is not tertiary alcohol), production efficiency of the polycarbodiimide composition is excellent, and storage stability is excellent as well.

For the low SP oxyethylene-noncontaining alcohol, preferably, monohydric alcohol with 4 or more and 12 or less carbon atoms is used, more preferably, isobutanol, 2-butanol, 2-methyl-1-butanol, 3-methoxy-1-butanol, 1-pentanol, 2,2-dimethyl-1-propanol, 1-hexanol, 1-heptanol, 1-octanol, 2-ethyl-1-hexanol, and 1-dodecanol are used. By using these, in particular, reactivity in the urethane-forming step to be described later is improved, and the polycarbodiimide composition can be produced with excellent efficiency, and storage stability of the produced polycarbodiimide composition is excellent.

The low SP oxyethylene-noncontaining alcohol has a solubility parameter (SP value) of, as described above, 11.20 $(cal/cm^3)^{1/2}$ or less, preferably 11.17 $(cal/cm^3)^{1/2}$ or less, more preferably 11.15 $(cal/cm^3)^{1/2}$ or less, even more preferably 11.13 $(cal/cm^3)^{1/2}$ or less, particularly preferably 11.11 $(cal/cm^3)^{1/2}$ or less, and for example, 9.50 $(cal/cm^3)^{1/2}$ or more, preferably 9.70 $(cal/cm^3)^{1/2}$ or more, more preferably 10.00 $(cal/cm^3)^{1/2}$ or more, even more preferably 10.10 $(cal/cm^3)^{1/2}$ or more, particularly preferably 10.15 $(cal/cm^3)^{1/2}$ or more.

When the low SP oxyethylene-noncontaining alcohol has a solubility parameter (SP value) within the above-described range, the cured resin with excellent storage stability, and excellent film-forming characteristics, water resistance, and chemical resistance can be produced.

For the oxyethylene-noncontaining alcohol, as necessary, the above-described low SP oxyethylene-noncontaining alcohol and other oxyethylene-noncontaining alcohol can be used in combination. The other oxyethylene-noncontaining alcohol is, in other words, alcohol with a solubility parameter (SP value) of more than 11.20 $(cal/cm^3)^{1/2}$ (in the following, referred to as high SP oxyethylene-noncontaining alcohol), high SP oxyethylene-noncontaining monol, and high SP oxyethylene-noncontaining polyol are used. That is, for the oxyethylene-noncontaining alcohol, along with the above-described low SP oxyethylene-noncontaining alcohol (low SP oxyethylene-noncontaining monol and/or low SP oxyethylene-noncontaining polyol), as necessary, in the range that does not hinder the effects of the invention, the high SP oxyethylene-noncontaining monol and/or high SP oxyethylene-noncontaining polyol can be used in combination.

These alcohols may be used singly or in a combination of two or more.

In the alcohols, the oxyethylene-containing alcohol and oxyethylene-noncontaining alcohol contents are adjusted so that the oxyethylene group content of the produced polycarbodiimide composition is within the predetermined range.

To be specific, the polycarbodiimide composition has an oxyethylene group content of, for example, 5 mass % or more, preferably 10 mass % or more, more preferably 15 mass % or more, and for example, 50 mass % or less, preferably 40 mass % or less, more preferably 35 mass % or less.

When the oxyethylene group content is within the above-described range, solubility to a solvent and water dispersiveness of the polycarbodiimide composition can be improved, and also a cured resin (described later) with excellent water resistance can be produced.

The oxyethylene group content can be calculated from the amount charged.

The oxyethylene-containing alcohol and oxyethylene-noncontaining alcohol contents in the alcohol are adjusted so that the oxyethylene group content of the polycarbodiimide composition is within the above-described range.

To be specific, relative to a total mol of the alcohol, the oxyethylene-containing alcohol content is, for example, 5 mol % or more, preferably 12 mol % or more, and for example, 50 mol % or less, preferably 48 mol % or less. The oxyethylene-noncontaining alcohol content is, for example, 50 mol % or more, preferably 52 mol % or more, and for example, 95 mol % or less, preferably 88 mol % or less.

When the oxyethylene-containing alcohol and oxyethylene-noncontaining alcohol contents in the alcohol are within the above-described range, solubility to a solvent and water dispersiveness of the polycarbodiimide composition can be improved, and cured resin (described later) with excellent water resistance can be produced.

The polycarbodiimide composition can be produced by allowing the above-described polyisocyanate to react with the above-described alcohol under predetermined conditions, and further subjecting it to carbodiimide-forming reaction.

In the following, the method for producing a polycarbodiimide composition is described in detail.

In this method, first, the above-described polyisocyanate and the above-described alcohol are subjected to urethane-forming reaction (urethane-forming step).

In the urethane-forming step, the polyisocyanate is allowed to react with the alcohol at the following reaction ratio: the equivalent ratio (NCO/OH) of the isocyanate group of polyisocyanate relative to the hydroxyl group of the alcohol is, for example, more than 2, and preferably 3 or more, more preferably 4 or more, and for example, 16 or less, preferably 14 or less, more preferably 10 or less. That is, in the urethane-forming step, preferably, reaction is carried out so that the isocyanate group is excessive relative to the hydroxyl group.

When the polyisocyanate is allowed to react with the alcohol at the reaction rate within the above-described range, cured resin with excellent storage stability, and excellent water resistance (described later) can be produced.

In this reaction, as necessary, known urethane-forming catalysts such as amines and organometallic compounds can be added.

Examples of the amines include tertiary amines such as triethylamine, triethylenediamine, bis-(2-dimethylaminoethyl) ether, and N-methylmorphiline; quaternary ammonium salts such as tetraethylhydroxyl ammonium; and imidazoles such as imidazole and 2-ethyl-4-methyl imidazole.

Examples of the organometallic compound include organic tin compounds such as tin acetate, tin octylate, tin oleate, tin laurate, dibutyltin diacetate, dimethyltin dilaurate, dibutyltin dilaurate, dibutyltin dimercaptide, dibutyltin maleate, dibutyltin dilaurate (dibutyltin (IV) dilaurate), dibutyltin dineodecanoate, dioctyltin dimercaptide, dioctyltin dilaurate, and dibutyltin dichloride; organic lead compounds such as lead octanoate and lead naphthenate; organic nickel compounds such as nickel naphthenate; organic cobalt compounds such as cobalt naphthenate; organic copper compounds such as copper octoate; organic bismuth compounds such as bismuth octylate and bismuth neodecanoate.

For the urethane-forming catalyst, for example, potassium salts such as potassium carbonate, potassium acetate, and potassium octoate are used.

These urethane-forming catalysts may be used singly or in a combination of two or more.

The urethane-forming catalyst is blended in an amount without particular limitation, and is suitably set in accordance with purpose and use.

The reaction conditions in the urethane-forming step are as follows: for example, under normal pressure and inert gas (for example, nitrogen gas) atmosphere, the reaction temperature is, for example, 30° C. or more, preferably 60° C. or more, and for example, 200° C. or less, preferably 180° C. or less. The reaction time is, for example, 1 hour or more, preferably 3 hours or more, and for example, 50 hours or less, preferably 40 hours or less.

The urethane-modified polyisocyanate (alcohol-modified product) can be produced in this manner. The urethane-modified polyisocyanate (alcohol-modified product) has an isocyanate group at its molecular end.

Then, in this method, the reaction solution containing the reaction product in the above-described urethane-forming step is heated in the presence of a carbodiimide-forming catalyst to cause a carbodiimide-forming reaction (carbodiimide-forming step).

The carbodiimide forming catalyst is not particularly limited, and examples thereof include trialkyl phosphoric acid ester compound, phosphoreneoxide compound, phosphorene sulfide compound, phosphine oxide compound, and phosphine compound.

Examples of the trialkyl phosphoric acid ester include trialkyl phosphoric acid ester compound having 3 to 24 carbon atoms such as trimethylphosphate, triethylphosphate, and trioctylphosphate.

Examples of the phosphoreneoxide compound include phosphoreneoxide compound having 4 to 18 carbon atoms such as 3-methyl-1-phenyl-2-phospholene-1-oxide (MPPO), 1-ethyl-3-methyl-2-phosphorene-1-oxide (EMPO), 1,3-dimethyl-2-phosphorene-1-oxide, 1-phenyl-2-phosphorene-1-oxide, 1-methyl-2-phosphorene-1-oxide, and 1-ethyl-2-phosphorene-1-oxide and their double bond isomers.

Examples of the phosphorene sulfide compound include a phosphorene sulfide compound having 4 to 18 carbon atoms such as 1-phenyl-2-phosphorene-1-sulfide.

Examples of the phosphine oxide compound include a phosphine oxide compound having 3 to 21 carbon atoms such as triphenylphosphineoxide and tritolylphosphine oxide.

Examples of the phosphine compound include a phosphine compound having 3 to 30 carbon atoms such as bis(oxadiphenylphosphino) ethane.

These carbodiimide forming catalysts may be used singly or in a combination of two or more.

For the carbodiimide forming catalyst, preferably, phosphoreneoxide compounds are used, more preferably 3-methyl-1-phenyl-2-phospholene-1-oxide, and 1-ethyl-3-methyl-2-phosphorene-1-oxide are used.

Use of the above-described carbodiimide forming catalyst allows for improvement in carbodiimide formation activities and decrease in reaction temperature. Side reactions such as uretonimine formation are suppressed, the polycarbodiimide composition can be produced with a good yield, and the carbodiimide group content can be improved.

For the carbodiimide forming catalyst, in view of producing a cured resin (described later) with excellent water resistance, particularly preferably, 3-methyl-1-phenyl-2-phospholene-1-oxide is used.

The carbodiimide forming catalyst is blended in an amount relative to 100 parts by mass of the polyisocyanate (polyisocyanate used in urethane-forming step) of, for example, 0.01 parts by mass or more, preferably 0.05 parts by mass or more, and for example, 20 parts by mass or less, preferably 10 parts by mass or less.

The reaction conditions in the carbodiimide-forming step are set such that the carbodiimide group content in the produced polycarbodiimide composition is within the specific range to be described later. To be more specific, in view of accelerating the carbodiimide-forming reaction, and decreasing uretonimine, under normal pressure and inert gas (nitrogen gas, etc.) atmosphere, the reaction temperature is, for example, 125° C. or more, preferably 130° C. or more, more preferably 135° C. or more, and for example, 160° C. or less, preferably 155° C. or less, more preferably less than 155° C. The reaction time is, for example, 1 hour or more, preferably 3 hours or more, and for example, 50 hours or less, preferably 40 hours or less.

By allowing them to react under such conditions, the reaction product produced in the urethane-forming step (urethane-modified polyisocyanate) can undergo decarboxylation condensation through the isocyanate group, and efficient production of carbodiimide group can be achieved.

To be more specific, when the reaction temperature is the above-described lower limit or more, the produced uretonimine allows for acceleration of reaction for decomposing into carbodiimide and isocyanate group, and also allows for acceleration of the carbodiimide-forming reaction. With the temperature of less than the above-described lower limit, the thermal decomposition reaction is not easily caused, the uretonimine content increases, and the carbodiimide group content is decreased. Furthermore, the increase in uretonimine causes increase in the molecular weight, which may cause solidification of the reaction solution. Meanwhile, when the reaction temperature is the above-described upper limit or less, polymerization loss can be decreased. When the temperature is more than the above-described upper limit, not only polymerization reaction other than the carbodiimide formation and uretonimine formation is accelerated and the carbodiimide group content decreases, but also with increase in the molecular weight, the reaction solution easily solidifies.

In the carbodiimide-forming step, in view of smoothly causing carbodiimide-forming reaction and also accelerating decarboxylation condensation, preferably, the reaction solution is refluxed in the presence of an organic solvent. That is, the carbodiimide-forming reaction is caused with refluxing.

Examples of the organic solvent include ketones such as acetone, methyl ethyl ketone, methylisobutylketone, and cyclohexanone; nitriles such as acetonitrile; alkylesters such as methyl acetate, ethyl acetate, butyl acetate, isobutyl acetate, and amyl acetate: aliphatic hydrocarbons such as n-hexane, n-heptane, and octane, alicyclic hydrocarbons such as cyclohexane and methylcyclohexane; aromatic hydrocarbons such as toluene, xylene, and ethylbenzene; glycol ether esters such as methylcellosolveacetate, ethylcellosolve acetate, methylcarbitol acetate, ethylcarbitol acetate, ethylene glycol methylether acetate, ethylene glycol ethylether acetate, propylene glycol methylether acetate (PMA), 3-methyl-3-methoxybutylacetate, and ethyl-3-ethoxypropionate; ethers such as diethylether, tetrahydrofuran, dioxane, 1,2-dimethoxyethane, diethylene glycol dimethylether, diethylene glycol diethylether, dipropylene glycol dimethylether, dipropylene glycol diethylether, ethylene glycol diethylether, and 1,2-diethoxyethane; halogenated aliphatic hydrocarbons such as methyl chloride, methylene chloride, chloroform, carbon tetrachloride, methyl bromide, methylene iodide, and dichloroethane; aprotic solvents such as N-methylpyrrolidone, dimethylformamide, N,N'-dimethylacetamide, dimethyl sulfoxide, and hexamethyl phosphonylamide. These organic solvents can be used singly, or can be used in combination of two or more.

For the organic solvent, preferably, those organic solvents having a temperature at the time of refluxing within the reaction temperature range of the above-described temperature are used.

For such an organic solvent, to be specific, xylene, ethylene glycol methylether acetate, and propylene glycol methylether acetate are used.

The organic solvent is blended in an amount of, without particular limitation, relative to 100 parts by mass of the polyisocyanate (polyisocyanate used in urethane-forming step), for example, 50 parts by mass or more, preferably 100) parts by mass or more, and for example, 2000 parts by mass or less, preferably 500 parts by mass or less.

By refluxing the reaction solution in the presence of an organic solvent, decomposition reaction of uretonimine can be accelerated, while smooth carbodiimide-forming reaction can be achieved, and carbon dioxide generated with the carbodiimide formation of the isocyanate group can be eliminated, and therefore acceleration of the carbodiimide formation can be achieved.

With such a method, a polycarbodiimide composition containing a urethane group and a carbodiimide group, and may contain a uretonimine group can be produced.

To be more specific, first, in the urethane-forming step, a urethane group derived from the isocyanate group of polyisocyanate is produced.

Then, when the reaction product produced in the urethane-forming step (urethane-modified polyisocyanate) is heated in the carbodiimide-forming step, the carbodiimide group derived from the isocyanate group at its molecular end is produced, and depending on cases, a portion of the produced carbodiimide group reacts with the isocyanate group at its molecular end to produce a uretonimine group. The uretonimine group goes through thermal decomposition as the heating continues in the carbodiimide-forming step, the carbodiimide group and the isocyanate group at its molecular end are regenerated, and further a carbodiimide group derived from the isocyanate group at its molecular end is produced.

In the above-described manner, the isocyanate group of polyisocyanate is converted to the urethane group and carbodiimide group (furthermore, to uretonimine group depending on cases).

As a result, a polycarbodiimide composition containing a urethane group and a carbodiimide group, and may contain a uretonimine group depending on cases can be produced.

In this method, as necessary, the polycarbodiimide composition produced in the above-described carbodiimide-forming step can be further allowed to react with the alcohol. In the following, the urethane-forming step before the carbodiimide-forming step may be named a first urethane-forming step, and the urethane-forming step after the carbodiimide-forming step may be named a second urethane-forming step.

To be specific, when the polycarbodiimide composition produced in the carbodiimide-forming step further has an isocyanate group at its molecular end, by allowing the polycarbodiimide composition to react with the alcohol, the isocyanate group at its molecular end can be subjected to urethane formation.

For the alcohol in the second urethane-forming step, the above-described oxyethylene-noncontaining alcohols are used.

The alcohol in the second urethane-forming step is blended with an adjustment so that a total amount of the alcohol used in the first urethane-forming step and the alcohol used in the second urethane-forming step is at a predetermined ratio relative to the polyisocyanate used in the first urethane-forming step.

To be specific, the equivalent ratio (NCO/OH) of the isocyanate group of polyisocyanate relative to a total amount of the hydroxyl group of the alcohol used in the first urethane-forming step and the hydroxyl group of the alcohol used in the second urethane-forming step is, for example, more than 2 and, preferably 3 or more, more preferably 4 or more, and for example, 16 or less, preferably 14 or less, more preferably 10 or less.

In this reaction, as necessary, the above-described urethane-forming catalyst can be added. The urethane-forming catalyst is blended in an amount without particular limitation, and it is suitably set in accordance with purpose and use.

Examples of the reaction conditions for the second urethane-forming step include the following: under normal pressure and inert gas (for example, nitrogen gas) atmosphere, the reaction temperature is preferably the same range as that of the reaction temperature in the above-described carbodiimide-forming step. The reaction time is, for example, 15 minutes or more, preferably 30 minutes or more, and for example, 5 hours or less, preferably 1 hour or less.

In this manner, the isocyanate group at its molecular end of polycarbodiimide composition and the hydroxyl group of the alcohol go through urethane-forming reaction.

As a result, a polycarbodiimide composition having no isocyanate group at its molecular end, or having a reduced amount of isocyanate group at its molecular end can be produced.

When the second urethane-forming step is carried out, the alcohol derived by-products increases, which may cause rapid increase in the molecular weight and decrease in flowability, which may cause reduction in workability, and reduction in dispersiveness of the water-dispersed composition. Therefore, preferably, only the first urethane-forming step and carbodiimide-forming step are carried out without performing the second urethane-forming step.

The method for producing a polycarbodiimide composition is not limited to the above-described one, and for example, it is also possible to blend the polyisocyanate, carbodiimide forming catalyst, and alcohol all at once, and heat the mixture.

As necessary, from the polycarbodiimide composition, for example, the unreacted polyisocyanate, unreacted alcohol, low molecular-weight compound (by-product), organic solvent, carbodiimide forming catalyst, and urethane-forming catalyst can be removed by a known method such as distillation, extraction, and filtration.

For the polycarbodiimide composition, as necessary, a known additive, for example, a storage stabilizer (o-toluenesulfonamide, p-toluenesulfonamide, etc.), plasticizer, anti-blocking agent, heat-resistant stabilizer, light stabilizer, antioxidant, release agent, catalyst, pigment, dye, lubricant, filler, and hydrolysis inhibitor can be further added at a suitable timing. The additive can be added at a ratio without particular limitation, and the amount is suitably set in accordance with purpose and use.

The polycarbodiimide composition can be used singly, or can be used in combination of two or more.

The thus produced polycarbodiimide composition has an oxyethylene group content of, as described above, for example, 5 mass % or more, preferably 10 mass % or more, more preferably 15 mass % or more, and for example, 50 mass % or less, preferably 40 mass % or less, more preferably 35 mass % or less.

When the polycarbodiimide composition has an oxyethylene group content within the above-described range, both of the water-dispersed composition (described later) and solution composition can be produced.

The polycarbodiimide composition is a reaction product of polyisocyanate having a primary isocyanate group and alcohol containing oxyethylene-containing alcohol and oxyethylene-noncontaining alcohol, and the oxyethylene-noncontaining alcohol has a solubility parameter of the above-described predetermined value or less.

Therefore, the polycarbodiimide composition can produce cured resin (described later) with excellent film-forming characteristics, water resistance, and chemical resistance, and its storage stability is excellent.

To be specific, by using a polycarbodiimide composition before storage, cured resin (described later) with excellent film-forming characteristics, water resistance, and chemical resistance can be produced. Furthermore, when the polycarbodiimide composition is to be stored, its reduction in handling properties can be suppressed. Furthermore, even when the polycarbodiimide composition after storage is used, cured resin (described later) with excellent film-forming characteristics, water resistance, and chemical resistance can be produced.

With the above-described method for producing a polycarbodiimide composition, the polycarbodiimide composition can be produced efficiently.

The polycarbodiimide composition has excellent storage stability, and the cured resin with excellent film-forming characteristics, water resistance, and chemical resistance can be produced, and therefore it can be suitably used as a curing agent in the resin composition.

The resin composition contains a curing agent containing the polycarbodiimide composition and a main component having a carboxyl group.

The curing agent is not particularly limited as long as the polycarbodiimide composition is contained, and for example, it is prepared as an aqueous dispersion in which the polycarbodiimide composition is dispersed in water (in the following, referred to as water-dispersed composition) and a solution in which the polycarbodiimide composition is dissolved in an organic solvent (in the following, referred to as solution composition).

The water-dispersed composition contains the polycarbodiimide composition and water.

The polycarbodiimide composition can be dispersed in water by a method without particular limitation, and the polycarbodiimide composition can be added with water, and the mixture is stirred, or water can be added with the polycarbodiimide composition, and the mixture can be stirred. Preferably, the polycarbodiimide composition is added with water.

The ratio of the polycarbodiimide composition to water is not particularly limited, but the polycarbodiimide composition (resin component) concentration in the water-dispersed composition (that is, solid content concentration) is, for example, 5 mass % or more, preferably 10 mass % or more, and for example, 90 mass % or less, preferably 80 mass % or less.

When the curing agent is a water-dispersed composition, compatibility with the water-based resin (main component) can be improved, and also a cured product with excellent film-forming characteristics, water resistance, and chemical resistance can be produced. Such a water-dispersed composition contains the above-described polycarbodiimide composition, and therefore has excellent storage stability.

The solution composition contains the polycarbodiimide composition and organic solvent.

Examples of the organic solvent include the above-described organic solvents, and preferably, methyl ethyl ketone, methylisobutylketone, ethyl acetate, butyl acetate, toluene, and xylene are used.

The polycarbodiimide composition can be dissolved in an organic solvent by any method without particular limitation, and for example, the organic solvent can be added to the polycarbodiimide composition and the mixture can be mixed, or the polycarbodiimide composition can be added to the organic solvent and the mixture can be mixed. Preferably, the organic solvent is added to the polycarbodiimide composition.

The ratio of the polycarbodiimide composition to the organic solvent is not particularly limited, and the solution composition has a polycarbodiimide composition (resin component) concentration (that is, solid content concentration) of, for example, 5 mass % or more, preferably 10 mass % or more, and for example, 90 mass % or less, preferably 80 mass % or less.

When the curing agent is a solution composition, compatibility with an oil-based resin (main component) can be improved, and a cured product with excellent film-forming characteristics, water resistance, and chemical resistance can be produced. Furthermore, such a solution composition contains the above-described polycarbodiimide composition, and therefore has excellent storage stability.

For the main component having a carboxyl group, a water-based resin having a carboxyl group, and an oil-based resin having a carboxyl group are used.

Examples of the water-based resin having a carboxyl group include a hydrophilic polymer having a carboxyl group, to be specific, hydrophilic polyester resin having a carboxyl group, hydrophilic polyamide resin having a carboxyl group, hydrophilic polyurethane resin having a carboxyl group, hydrophilic acrylic resin having a carboxyl group, and hydrophilic polyolefin resin having a carboxyl group (for example, polypropylene, polyethylene, polypropylene-polyethylene (random-block) copolymer, and also polyolefin with a repeating unit having carbon atoms of 4 or more). These water-based resins having a carboxyl group may be used singly or in a combination of two or more.

For the water-based resin having a carboxyl group, preferably, hydrophilic polyurethane resin having a carboxyl group, and hydrophilic acrylic resin having a carboxyl group are used.

Examples of the oil-based resin having a carboxyl group include hydrophobic polymer having a carboxyl group, and to be specific, hydrophobic polyester resin having a carboxyl group, hydrophobic polyamide resin having a carboxyl group, hydrophobic polyurethane resin having a carboxyl group, hydrophobic acrylic resin having a carboxyl group, hydrophobic polyolefin resin having a carboxyl group (for example, polypropylene, polyethylene, polypropylene-polyethylene (random-block) copolymer, and also polyolefin with a repeating unit having carbon atoms of 4 or more). These oil-based resins having a carboxyl group may be used singly or in a combination of two or more.

For the oil-based resin having a carboxyl group, preferably, hydrophobic polyurethane resin having a carboxyl group, and hydrophobic acrylic resin having a carboxyl group are used.

These can be used singly, or can be used in combination of two or more.

For the main component and curing agent, preferably, a combination of the following is used: a main component of water-based resin, and a curing agent of water-dispersed composition. Also preferably, a combination of a main component of oil-based resin and a curing agent of the solution composition can be used.

For the resin composition, in view of reducing an organic solvent to protect earth environment, preferably, a combination of a water-based main component and a water-dispersed composition is used.

The resin composition is not particularly limited as long as the above-described main component and the above-described curing agent are contained. It can be a two-component type in which a main component and a curing agent are separately prepared, and are mixed at the time of usage, or it can be a one-component type, in which the main component and the curing agent are mixed in advance.

For the resin composition, preferably, a two-component type resin composition is used.

The main component and curing agent contents relative to 100 parts by mass of their total is as follows: the main component content is, for example, 10 parts by mass or more, preferably 30 parts by mass or more, and for example, 99.5 parts by mass or less, preferably 95.0 parts by mass or less. The curing agent content is, for example, 0.5 parts by mass or more, preferably 5 parts by mass or more, and for example, 90 parts by mass or less, preferably 70 parts by mass or less.

The molar ratio of the carbodiimide group in the curing agent relative to the carboxyl group in the main component is, for example, 0.1 or more, preferably 0.2 or more, and for example, 2.0 or less, preferably 1.5 or less.

To one of or both of the main component and the curing agent, as necessary, for example, epoxy resins, catalysts, coatability improvers, leveling agents, defoamers, stabilizers such as antioxidants and ultraviolet absorbers, plasticizers, surfactants, pigments, fillers, organic or inorganic fine particles and mildew proofing agents, and silane coupling agents can be blended. The amount of these additives is suitably decided according to the purposes and applications.

For the main component, the above-described water-based resin having a carboxyl group, and/or the above-described oil-based resin having a carboxyl group, and other resin (for example, hydroxyl group-containing polyurethane resin, hydroxyl group-containing acrylic resin, hydroxyl group-containing polyester resin, melamine resin, etc.) can be used in combination.

For the curing agent, the above-described polycarbodiimide composition and other curing agent (for example, polyisocyanate resin, epoxy resin, etc.) can be used in combination.

In such a resin composition, the above-described polycarbodiimide composition is used as the curing agent, and therefore it has excellent storage stability, and the cured resin with excellent film-forming characteristics, water resistance, and chemical resistance can be produced.

The resin cured product production method is not particularly limited, and for example, when the resin composition is a one-component type, the resin composition is applied as is to an application subject or adherend. When a two-component type resin composition is used, the main component and the curing agent are blended, and the produced mixture is applied to an application subject or adherend. Then, by heating and curing the resin composition, a cured resin is produced.

The curing temperature of the above-described resin composition is relatively low, and to be specific, it is for example, 100° C. or less, preferably 80° C. or less. For example, 20° C. or more, preferably 30° C. or more.

The curing time is relatively short, to be specific, for example, 1 hour or less, preferably 30 minutes or less. For example, 1 minute or more, preferably 5 minutes or more.

As necessary, the heated and cured resin can also be further dried.

In such a case, the drying temperature can be a room temperature, and for example, 10° C. or more, preferably 15° C. or more, and for example, 40° C. or less, preferably 30° C. or less.

The drying time is, for example, 1 minute or more, preferably 5 minutes or more, and for example, 2 hours or less, preferably 1 hour or less.

The produced cured resin is a cured product of the resin composition having excellent storage stability, and therefore it has excellent productivity, and also excellent film-forming characteristics, water resistance, and chemical resistance.

When the polycarbodiimide composition is produced by using aliphatic polyisocyanate, the cured resin produced by using the polycarbodiimide composition also has excellent light resistance (weather resistance).

Therefore, the resin composition and cured resin can be suitably used in various fields of, for example, a coating material, adhesive material (adhesive), pressure sensitive adhesive material (pressure sensitive adhesive), ink, sealant, molding material, foam and optical material, and furthermore, a resin modifier that modifies resin such as polyester, polylactic acid, polyamide, polyimide, and polyvinyl alcohol, treatment for textile printing, and treatment for fiber.

When it is used as a coating material, it can be used as, for example, a coating material for plastics, coating material for automobile exterior, coating material for automobile interior, coating material for electrical and electronic material, coating material for optical materials (lens, etc.), coating material for building materials, coating material for glasses, coating material for woodwork, coating material for films, coating material for ink, coating material (coating agent) for artificial and synthetic leather, coating material (coating agent) for can, coating material for paper, and coating material for thermal paper.

Examples of the above-described coating material for plastics include a coating material for molded products in which plastic materials (for example, various polymer materials such as polyolefins, ABS, polycarbonates, polyamides, polyesters and their composite material) are used: to be specific, a coating material for housing (mobile phone, smart phone, personal computer, tablet, etc.), for automobile components (automobile interior or head lamp, etc.), coating material for household electronic appliances, robot materials, furniture, stationeries, soft materials such as rubber, elastomer, and gel, eyewear materials (lens, etc.), and optical lenses for electronic devices (surface coating agent).

Examples of the above-described automobile exterior coating materials include a coating material for new car (intermediate, base, top, etc.), for automobile repairing (intermediate, base, top, etc.), and exterior components (aluminum wheel, bumper, etc.).

When the above-described resin composition is used as a coating material for automobile exterior, for the main component, the above-described water-based resin having a carboxyl group and the above-described oil-based resin having a carboxyl group can be used. Preferably, the water-based resin having a carboxyl group is used.

For the water-based resin having a carboxyl group, preferably, hydrophilic acrylic resin having a carboxyl group, hydrophilic polyurethane resin having a carboxyl group, and hydrophilic polyester resin having a carboxyl group are used, more preferably, hydrophilic acrylic resin having a carboxyl group, and hydrophilic polyester resin having a carboxyl group are used. Two or more types of the above-described water-based resin having a carboxyl group can be used.

For the main component, the above-described water-based resin having a carboxyl group, and/or the above-described oil-based resin having a carboxyl group can be used in combination with other resin (for example, hydroxyl group-containing polyurethane resin, hydroxyl group-containing acrylic resin, and hydroxyl group-containing polyester resin, melamine resin, etc.).

When the above-described resin composition is used as a coating material for automobile exterior, the main component has a solid content concentration of generally 5 mass % or more, preferably 20 mass % or more, more preferably 30 mass % or more, and for example, 80 mass % or less, preferably 70 mass % or less, more preferably 60 mass % or less.

The main component has a solid content-based acid number of, for example, 5 mgKOH/g or more, preferably 10 mgKOH/g or more, and for example, 200 mgKOH/g or less, preferably 100 mgKOH/g or less.

Examples of the curing agent include the above-described polycarbodiimide composition, and the polycarbodiimide composition can be used in combination with other curing agent (for example, polyisocyanate resin, epoxy resin, etc.).

Examples of the above-described coating material for films include coating material for optical members (optical film, optical sheet, etc.), optical material, fiber, electrical and electronic materials, food packages, medical films, cosmetics packages, decoration films, and release films.

Examples of the adhesive include an adhesive for packaging, electrical devices, liquid display (LCD), organic EL display, organic EL lightings, display device (electronic paper and plasma display, etc.), LED, automobile interior and exterior, household appliances, construction materials, solar battery back sheets, and various batteries (lithium ion battery, etc.).

Examples of the above-described resin for ink include a vehicle for various inks (for plates, screens, flexographic ink, gravure ink, jet ink, textile printing ink, etc.).

Use of the polycarbodiimide composition is not limited to the above-described ones. A solid polycarbodiimide composition can be used as a hydrolysis inhibitor for polyester and polyamide resin, polylactic acid, and a liquid polycarbodiimide composition can be used for a hydrolysis inhibitor for polyesterpolyol. The polycarbodiimide composition can also be made into a composite with acid-modified polyolefin, for example, maleic acid modified polyolefin; made into a composite with polyolefin emulsion in which acid-modified polyolefin is dispersed in water, or as a curing agent thereof; made into a composite with acrylic emulsion containing acid site, or as a curing agent thereof; fixing agent for fiber such as carbon fiber and glass fiber; reinforcing agent for fiber-reinforced plastics such as CFRP and FRP, or sizing agent, or curing agent.

EXAMPLES

While in the following, the present invention is described with reference to Production Examples, Examples, and Comparative Examples, the present invention is not limited to any of them by no means. The "parts" and "%" are based on mass unless otherwise specified. The specific numerical values in blending ratio (content ratio), physical property value, and parameter used in the following description can be replaced with upper limit values (numerical values defined with "or less" or "below") or lower limit values (numerical values defined with "or more" or "above") of corresponding numerical values in blending ratio (content ratio), physical property value, and parameter described in the above-described "DESCRIPTION OF EMBODIMENTS".

<Oxyethylene Group Content (Mass %) in Polycarbodiimide Composition>

The oxyethylene group content relative to the polycarbodiimide composition was calculated from the amount charged and chemical structural formula.

Production Example 1 (Production of Pentamethylene Diisocyanate)

99.9 mass % of 1,5-pentamethylenediisocyanate (hereinafter may be referred to as PDI) was produced in the same manner as in Example 1 of DESCRIPTION of International Patent Publication WO 2012/121291.

Example 1

Production of Polycarbodiimide Composition

A four-neck flask equipped with a stirrer, thermometer, reflux pipe, and nitrogen inlet tube was charged with 100.0 parts by mass of pentamethylene diisocyanate produced in Production Example 1, 34.6 parts by mass of UNIOXM400 (manufactured by NOF corporation, polyethylene glycol monomethylether, molecular weight 400), and 9.6 parts by mass of isobutanol under room temperature. Heating was carried out to 80° C. while introducing nitrogen under normal pressure, and stirring was carried out for 6 hours (urethane-formation step).

Then, 302.8 parts by mass of PMA (propylene glycol monomethylether acetate) and 2.0 parts by mass of 3-methyl-1-phenyl-2-phospholene-1-oxide (MPPO) were introduced, and stirring was carried out for 7 hours while refluxing (150° C.) to terminate the reaction (carbodiimide-formation step).

After termination of reaction, cooling was carried out to 80° C., and PMA was distilled off under reduced pressure, thereby producing a polycarbodiimide composition. A portion of the produced polycarbodiimide composition was taken out, and subjected to a measurement of type E viscosity at 25° C. The result was 1100 mPa·s. Furthermore, a portion of the produced polycarbodiimide composition was stored at 25° C. for 2 months in a nitrogen atmosphere, and then the type E viscosity at 25° C. was measured. The result was 2500 mPa·s.

Preparation of Aqueous Dispersion of Polycarbodiimide Composition (Water-Dispersed Composition)

The polycarbodiimide composition was put into a flask, heated to 80° C. and distilled water was gradually added so that the resin solid content was 40%. After stirring for 5 minutes, it was cooled to room temperature. The aqueous dispersion of polycarbodiimide composition was produced in this manner. For the polycarbodiimide composition stored at 25° C. for 2 months in a nitrogen atmosphere, an aqueous dispersion was prepared in the same manner.

Preparation of Polycarbodiimide Composition Solution (Solution Composition)

The polycarbodiimide composition was put into a flask, heated to 80° C., and butyl acetate was gradually added so that the resin solid content was 40%. After stirring for 5 minutes, it was cooled to room temperature. A solution of the polycarbodiimide composition was produced in this manner. For the polycarbodiimide composition stored at 25° C. for 2 months in a nitrogen atmosphere, a solution composition prepared in the same manner.

Preparation of Water-Based Resin Composition

The produced aqueous dispersion of polycarbodiimide composition was used as a curing agent. A resin composition was prepared by mixing 1.5 parts by mass of the curing agent and 98.5 parts by mass of polyurethane dispersion (solid content 30 mass %, carboxyl group equivalent 3100 g/mol) as the main component.

Preparation of Solvent-Based Resin Composition

The solution of the produced polycarbodiimide composition was used as the curing agent. A resin composition was prepared by mixing 1.0 parts by mass of the curing agent, 39.2 parts by mass of acrylic resin (solid content 50 mass %, solid carboxyl group equivalent 2004 g/mol) as the main component, and 59.8 parts by mass of butyl acetate as the solvent.

Example 2

A polycarbodiimide composition was produced in the same manner as in Example 1, except that 9.6 parts by mass of 2-butanol was added instead of isobutanol.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared.

Example 3

A polycarbodiimide composition was produced in the same manner as in Example 1, except that 11.4 parts by mass of 2-methyl-1-butanol instead of isobutanol and 306.5 parts by mass of PMA were added.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared.

Example 4

A polycarbodiimide composition was produced in the same manner as in Example 1, except that 11.4 parts by mass of 2,2-dimethyl-1-propanol instead of isobutanol and 306.5 parts by mass of PMA were added.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared.

Example 5

A polycarbodiimide composition was produced in the same manner as in Example 1, except that 13.5 parts by mass of 3-methoxy-1-butanol instead of isobutanol and 310.8 parts by mass of PMA were added.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared.

Example 6

A polycarbodiimide composition was produced in the same manner as in Example 1, except that 16.9 parts by mass of 1-octanol instead of isobutanol and 317.8 parts by mass of PMA were added.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared.

Example 7

A polycarbodiimide composition was produced in the same manner as in Example 1, except that 16.9 parts by mass of 2-ethyl-1-hexanol instead of isobutanol and 317.8 parts by mass of PMA were added.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared.

Example 8

A polycarbodiimide composition was produced in the same manner as in Example 1, except that 24.2 parts by mass of 1-dodecanol instead of isobutanol and 332.9 parts by mass of PMA were added.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared.

Example 9

A polycarbodiimide composition was produced in the same manner as in Example 1, except that 35.1 parts by mass of 1-octadecanol instead of isobutanol and 355.5 parts by mass of PMA were added.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared. However, the polycarbodiimide composition stored at 25° C. for 2 months in a nitrogen atmosphere was solidified (the solid was waxy), and an aqueous dispersion was not produced.

Example 10

A polycarbodiimide composition was produced in the same manner as in Example 1, except that 43.2 parts by mass of UNIOXM400, 24.0 parts by mass of isobutanol, and 350.6 parts by mass of PMA were added, and the reaction time of the carbodiimide-forming step was changed to 6.5 hours.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared.

Example 11

A polycarbodiimide composition was produced in the same manner as in Example 1, except that 23.1 parts by mass of UNIOXM400, 6.4 parts by mass of isobutanol, and 272.2 parts by mass of PMA were added, and the reaction time of the carbodiimide-forming step was changed to 8 hours.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared.

Example 12

A polycarbodiimide composition was produced in the same manner as in Example 1, except that 12.4 parts by mass of UNIOXM400, 13.7 parts by mass of isobutanol, and 265.2 parts by mass of PMA were added.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared. The aqueous dispersion was slightly inhomogeneous. Thereafter, a resin composition was prepared in the same manner as in Example 1.

Example 13

A polycarbodiimide composition was produced in the same manner as in Example 1, except that 74.1 parts by mass of UNIOXM400, 2.3 parts by mass of isobutanol, and 369.5 parts by mass of PMA were added.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared.

Example 14

A polycarbodiimide composition was produced in the same manner as in Example 1, except that 9.6 parts by mass of tert-butanol was added instead of isobutanol, and the reaction time of urethane-forming step was changed to 12 hours.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared.

Example 15

A four-neck flask equipped with a stirrer, thermometer, reflux pipe, and nitrogen inlet tube was charged with 100.0 parts by mass of 1,3-xylylenediisocyanate, 28.3 parts by mass of UNIOXM400, and 7.9 parts by mass of isobutanol under room temperature. While introducing nitrogen, the mixture was heated to 80° C. and stirred for 2 hours under normal pressure (urethane-forming step).

Thereafter, 286.2 parts by mass of xylene and 2.0 parts by mass of 3-methyl-1-phenyl-2-phosphorine-1-oxide were added, and the mixture was stirred for 3 hours with refluxing (141° C.), terminating the reaction (carbodiimide-forming step).

After the termination of the reaction, it was cooled to 80° C., and xylene was distilled off under reduced pressure, thereby producing a polycarbodiimide composition.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared.

Example 16

A four-neck flask equipped with a stirrer, thermometer, reflux pipe, and nitrogen inlet tube was charged with 100.0 parts by mass of 1,3-bis(isocyanatomethyl) cyclohexane, 27.5 parts by mass of UNIOXM400, and 7.6 parts by mass of isobutanol under room temperature. While introducing nitrogen, the mixture was heated to 80° C., and stirred for 7 hours under normal pressure (urethane-forming step).

Thereafter, 283.9 parts by mass of PMA and 2.0 parts by mass of 3-methyl-1-phenyl-2-phosphorine-1-oxide were added, and the mixture was stirred for 9 hours with refluxing (150° C.), and the reaction was terminated (carbodiimide-forming step).

After the termination of the reaction, it was cooled to 80° C., and PMA was distilled off under reduced pressure, thereby producing a polycarbodiimide composition.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared.

Example 17

A four-neck flask equipped with a stirrer, thermometer, reflux pipe, and nitrogen inlet tube was charged with 100.0 parts by mass of isophoronediisocyanate, 33.0 parts by mass of UNIOXM400, and 8.1 parts by mass of isobutanol under room temperature. While introducing nitrogen, the mixture was heated to 80° C. under normal pressure, and stirred for 7 hours (urethane-forming step).

Thereafter, 296.2 parts by mass of PMA and 2.0 parts by mass of 3-methyl-1-phenyl-2-phosphorine-1-oxide were added, and the mixture was stirred for 9 hours with refluxing (150° C.), thereby terminating the reaction (carbodiimide-forming step).

After the termination of the reaction, it was cooled to 80° C., and PMA was distilled off under reduced pressure, thereby producing a polycarbodiimide composition.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared.

Example 18

A polycarbodiimide composition was produced in the same manner as in Example 1, except that 100 parts by mass of hexamethylene diisocyanate instead of pentamethylene diisocyanate, 31.7 parts by mass of UNIOXM400, 8.8 parts by mass of isobutanol, and 295.1 parts by mass of PMA were added.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared.

Comparative Example 1

A polycarbodiimide composition was produced in the same manner as in Example 1, except that 4.2 parts by mass of methanol instead of isobutanol and 291.5 parts by mass of PMA were added.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared. However, the polycarbodiimide composition stored at 25° C. for 2 months in a nitrogen atmosphere was solidified (the solid was rubbery), and neither aqueous dispersion nor solution was produced.

Comparative Example 2

A polycarbodiimide composition was produced in the same manner as in Example 1, except that 9.6 parts by mass of 1-butanol was added instead of isobutanol.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared. However, the polycarbodiimide composition stored at 25° C. for 2 months in a nitrogen atmosphere was solidified (the solid was rubbery), and neither aqueous dispersion nor solution was produced.

Comparative Example 3

A polycarbodiimide composition was produced in the same manner as in Example 1, except that 11.7 parts by mass of 1-methoxy-2-propanol instead of isobutanol and 307.1 parts by mass of PMA were added.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared. However, the polycarbodiimide composition stored at 25° C. for 2 months in a nitrogen atmosphere was solidified (the solid was rubbery), and neither aqueous dispersion nor solution was produced.

Comparative Example 4

A polycarbodiimide composition was produced in the same manner as in Example 1, except that 13.0 parts by mass of cyclohexanol instead of isobutanol and 309.8 parts by mass of PMA were added.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared. However, the polycarbodiimide composition stored at 25° C. for 2 months in a nitrogen atmosphere was solidified (the solid was rubbery), and neither aqueous dispersion nor solution was produced.

Comparative Example 5

A polycarbodiimide composition was produced in the same manner as in Example 1, except that 14.0 parts by mass of benzylalcohol instead of isobutanol and 311.9 parts by mass of PMA were added.

The viscosity of the produced polycarbodiimide composition was measured in the same manner as in Example 1. The results are shown in Tables 1 to 4.

An aqueous dispersion and a solution of the polycarbodiimide composition were prepared in the same manner as in Example 1, and a resin composition was prepared. However, the polycarbodiimide composition stored at 25° C. for 2 months in a nitrogen atmosphere was solidified (the solid was rubbery), and neither aqueous dispersion nor solution was produced.

Comparative Example 6

A polycarbodiimide composition was produced in the same manner as in Example 1, except that 16.1 parts by mass of 4-methoxyphenol instead of isobutanol and 316.2 parts by mass of PMA were added. While PMA was distilled off under reduced pressure, the viscosity increased gradually and it was solidified (the solid was rubbery). Therefore, neither aqueous dispersion nor solution of polycarbodiimide was produced.

Comparative Example 7

A polycarbodiimide composition was synthesized based on the method described in Synthesis Example 83 of Japanese Unexamined Patent Publication No. H10-316930.

To be specific, a four-neck flask equipped with a stirrer, thermometer, reflux pipe, and nitrogen inlet tube was charged with 1008 parts by mass of hexamethylene diisocyanate, and 800 parts by mass of UNIOXM400 (manufactured by NOF corporation polyethyleneglycol monomethyl ether molecular weight 400) under room temperature. While introducing nitrogen, the mixture was heated to 120° C. under normal pressure, and stirred for 1 hour. Thereafter, 13.5 parts by mass of 3-methyl-1-phenyl-2-phospholene-1-oxide was added thereto, and an attempt was made to stir the mixture under nitrogen flow with heating to 185° C. for 5 hours. After passing 2 hours, the reaction solution was solidified (the solid was rubbery).

Thereafter, an attempt was made to prepare the aqueous dispersion and solution of the polycarbodiimide composition in the same manner as in Example 1, but the polycarbodiimide composition sedimented, and neither the aqueous dispersion nor solution was produced.

<Evaluation>
<Stability Test>

Stability Test at 40° C.

1.0 part by mass of the produced polycarbodiimide composition was put into a 10 mL screw bottle and nitrogen blow was carried out. Thereafter, the bottle was closed with a screw cap, and it was stored at 40° C. Observation was made until there is no flowability (the bottle was turned upside down, and until there is no polycarbodiimide flow). The solution of the polycarbodiimide composition thus prepared was tested in the same manner as well.

4 Took one month or more until there is no flowability.
3 Took 2 weeks or more and less than one month until there is no flowability.
2 Took one week or more and less than 2 weeks until there is no flowability.
1 Took less than 1 week until there is no flowability.

<Evaluation>

Evaluation on Coating

The resin composition was applied on a standard test plate (JIS-G-3303 SPTE) using a 250 mil doctor blade, and thereafter it was dried at 80° C. for 10 minutes and for 30 minutes, and further at room temperature for 1 hour, thereby producing a coating made of the cured resin.

The produced coating was evaluated in the following manner.

<Film-Forming Characteristics>

The appearance of the coating (80° C. for 10 minutes) was evaluated visually. The evaluation criteria are shown below.
Good: Clear and smooth coating.
No good: inhomogeneous.

<Water Resistance>

Distilled water was spotted on the coating (80° C. for 10 minutes), and the appearance changes of the coating were visually checked after allowing it to stand at 23° C. for 24 hours.

The evaluation criteria are shown below.
Good: No changes.
No good: whitening occurred.

<Solvent Resistance (Chemical Resistance)>

A gauze was immersed in methyl ethyl ketone (when water-based resin composition was used), or in 50% aqueous solution of ethanol (when solvent-based resin composition was used), and the gauze was pressed and rubbed onto the top coating (80° C. 10 minutes and 30 minutes) with a load of 50 g, and the time until the coating cracked was counted. The evaluation criteria are shown below.

4: the coating cracked by 300 times or more
3: the coating cracked by 250 times or more and less than 300 times.
2: the coating cracked by 100 times or more and less than 250 times.
1: the coating cracked by less than 100 times.

TABLE 1

| | | | | | Example 1 | Example 2 | Example 3 | Example 4 | Example 5 | Example 6 |
|---|---|---|---|---|---|---|---|---|---|---|
| Urethane-forming step | Mixing formulation | Polyisocyanate | Type | | PDI | PDI | PDI | PDI | PDI | PDI |
| | | | Parts by mass | | 100 | 100 | 100 | 100 | 100 | 100 |
| | | Oxyethylene-containing alcohol | Type | | UNIOX M400 | UNIOX M400 | UNIOX M400 | UNIOX M400 | UNIOX M400 | UNIOX M400 |
| | | | Parts by mass | | 34.6 | 34.6 | 34.6 | 34.6 | 34.6 | 34.6 |
| | | Oxyethylene-noncontaining alcohol | Type | | Iso-butanol | 2-butanol | 2-methyl-1-butanol | 2,2-dimethyl-1-propanol | 3-methoxy-1-butanol | 1-octanol |
| | | | Sp value ((cal/cm3)^(1/2)) | | 11.11 | 11.11 | 10.77 | 10.58 | 10.92 | 10.28 |
| | | | Parts by mass | | 9.6 | 9.6 | 11.4 | 11.4 | 13.5 | 16.9 |
| | Reaction conditions | Reaction temperature | ° C. | | 80 | 80 | 80 | 80 | 80 | 80 |
| | | Reaction time | Time | | 6 | 6 | 6 | 6 | 6 | 6 |
| Carbodiimide-forming step | Mixing formulation | Organic solvent | Type | | PMA | PMA | PMA | PMA | PMA | PMA |
| | | | Parts by mass | | 302.8 | 302.8 | 306.5 | 306.5 | 310.8 | 317.8 |
| | | Catalyst | Type | | MPPO | MPPO | MPPO | MPPO | MPPO | MPPO |
| | | | Parts by mass | | 2.0 | 2.0 | 2.0 | 2.0 | 2.0 | 2.0 |
| | Reaction conditions | Reaction temperature | ° C. | | 150 | 150 | 150 | 150 | 150 | 150 |
| | | Reaction time | Time | | 7 | 7 | 7 | 7 | 7 | 7 |
| Analysis | | Equivalent ratio $R_{Total}$ (NCO/OH) | | | 6.0 | 6.0 | 6.0 | 6.0 | 6.0 | 6.0 |
| | | Oxyethylene group/composition (mass %) | | | 23.1 | 23.1 | 22.8 | 22.8 | 22.5 | 22.0 |
| Storage stability | Immediately after synthesis | Type E viscosity (25° C.) | Polycarbodiimide composition | mPa · s | 1100 | 1100 | 1100 | 1100 | 1100 | 1150 |
| | Storage at 25° C. for 2 months | | Polycarbodiimide composition | mPa · s | 2500 | 2800 | 2900 | 2900 | 3000 | 2900 |
| | Storage at 40° C. | Disappearance of flowability | Polycarbodiimide composition | (Good) 4 > 1 (Bad) | 3 | 3 | 3 | 3 | 3 | 3 |
| | | | Solution composition (NV40%) | (Good) 4 > 1 (Bad) | 4 | 4 | 4 | 4 | 4 | 4 |
| Evaluation (coating 80° C.) | Water-based | Water-dispersed composition prepared immediately after synthesis | Film-forming characteristics | Good or No good | Good | Good | Good | Good | Good | Good |
| | | | Water resistance | Good or No good | Good | Good | Good | Good | Good | Good |
| | | | Chemical resistance (10 minutes) | (Good) 4 > 1 (Bad) | 4 | 4 | 4 | 4 | 4 | 4 |
| | | | Chemical resistance (30 minutes) | (Good) 4 > 1 (Bad) | 4 | 4 | 4 | 4 | 4 | 4 |
| | | Water-dispersed composition prepared after storage at 25° C. for 2 months | Film-forming characteristics | Good or No good | Good | Good | Good | Good | Good | Good |
| | | | Water resistance | Good or No good | Good | Good | Good | Good | Good | Good |
| | | | Chemical resistance (10 minutes) | (Good) 4 > 1 (Bad) | 4 | 4 | 4 | 4 | 4 | 4 |
| | | | Chemical resistance (30 minutes) | (Good) 4 > 1 (Bad) | 4 | 4 | 4 | 4 | 4 | 4 |
| | Solvent-based | Solution composition prepared immediately after synthesis | Film-forming characteristics | Good or No good | Good | Good | Good | Good | Good | Good |
| | | | Chemical resistance (10 minutes) | (Good) 4 > 1 (Bad) | 4 | 4 | 4 | 4 | 4 | 4 |
| | | | Chemical resistance (30 minutes) | (Good) 4 > 1 (Bad) | 4 | 4 | 4 | 4 | 4 | 4 |
| | | Solution composition prepared after storage at 25° C. for 2 months | Film-forming characteristics | Good or No good | Good | Good | Good | Good | Good | Good |
| | | | Chemical resistance (10 minutes) | (Good) 4 > 1 (Bad) | 4 | 4 | 4 | 4 | 4 | 4 |
| | | | Chemical resistance (30 minutes) | (Good) 4 > 1 (Bad) | 4 | 4 | 4 | 4 | 4 | 4 |

TABLE 2

|  |  |  |  | No. Example 7 | Example 8 | Example 9 | Example 10 | Example 11 | Example 12 |
|---|---|---|---|---|---|---|---|---|---|
| Urethane-forming step | Mixing formulation | Polyisocyanate | Type | PDI | PDI | PDI | PDI | PDI | PDI |
|  |  |  | Parts by mass | 100 | 100 | 100 | 100 | 100 | 100 |
|  |  | Oxyethylene-containing alcohol | Type | UNIOX M400 | UNIOX M400 | UNIOX M400 | UNIOX M400 | UNIOX M400 | UNIOX M400 |
|  |  |  | Parts by mass | 34.6 | 34.6 | 34.6 | 43.2 | 23.1 | 12.4 |
|  |  | Oxyethylene-noncontaining alcohol | Type | 2-ethyl-1-hexanol | 1-dodecanol | 1-octa-decanol | Iso-butanol | Iso-butanol | Iso-butanol |
|  |  |  | Sp value ((cal/cm3)^(1/2)) | 10.14 | 9.81 | 9.45 | 11.11 | 11.11 | 11.11 |
|  |  |  | Parts by mass | 16.9 | 24.2 | 35.1 | 24.0 | 6.4 | 13.7 |
|  | Reaction conditions | Reaction temperature | °C. | 80 | 80 | 80 | 80 | 80 | 80 |
|  |  | Reaction time | Time | 6 | 6 | 6 | 6 | 6 | 6 |
| Carbodiimide-forming step | Mixing formulation | Organic solvent | Type | PMA | PMA | PMA | PMA | PMA | PMA |
|  |  |  | Parts by mass | 317.8 | 332.9 | 355.5 | 350.6 | 272.2 | 265.2 |
|  |  | Catalyst | Type | MPPO | MPPO | MPPO | MPPO | MPPO | MPPO |
|  |  |  | Parts by mass | 2.0 | 2.0 | 2.0 | 2.0 | 2.0 | 2.0 |
|  | Reaction conditions | Reaction temperature | °C. | 150 | 150 | 150 | 150 | 150 | 150 |
|  |  | Reaction time | Time | 7 | 7 | 7 | 6.5 | 8 | 7 |
| Analysis |  | Equivalent ratio $R_{Total}$ (NCO/OH) |  | 6.0 | 6.0 | 6.0 | 3.0 | 9.0 | 6.0 |
|  |  | Oxyethylene group/composition (mass %) |  | 22.0 | 21.0 | 19.6 | 24.9 | 17.1 | 9.4 |
| Storage stability | Immediately after synthesis | Type E viscosity (25° C.) | Polycarbodiimide composition mPa·s | 1150 | 1300 | 8450 | 600 | 1750 | 1050 |
|  | Storage at 25° C. for 2 months |  | Polycarbodiimide composition mPa·s | 2800 | 3250 | Solidified (waxy) | 1400 | 8200 | 2400 |
|  | Storage at 40° C. | Disappearance of flowability | Polycarbodiimide composition (Good) 4 > 1 (Bad) | 3 | 3 | 3 | 3 | 2 | 3 |
|  |  |  | Solution composition (NV40%) (Good) 4 > 1 (Bad) | 4 | 4 | 4 | 4 | 3 | 4 |
| Evaluation (coating 80° C.) | Water-based | Water-dispersed composition prepared immediately after synthesis | Film-forming characteristics Good or No good | Good | Good | Good | Good | Good | No good |
|  |  |  | Water resistance Good or No good | Good | Good | Good | Good | Good | Good |
|  |  |  | Chemical resistance (10 minutes) (Good) 4 > 1 (Bad) | 4 | 4 | 4 | 3 | 4 | 4 |
|  |  |  | Chemical resistance (30 minutes) (Good) 4 > 1 (Bad) | 4 | 4 | 4 | 3 | 4 | 4 |
|  |  | Water-dispersed composition prepared after storage at 25° C. for 2 months | Film-forming characteristics Good or No good | Good | Good | — | Good | Good | No good |
|  |  |  | Water resistance Good or No good | Good | Good | — | Good | Good | Good |
|  |  |  | Chemical resistance (10 minutes) (Good) 4 > 1 (Bad) | 4 | 4 | — | 3 | 4 | 4 |
|  |  |  | Chemical resistance (30 minutes) (Good) 4 > 1 (Bad) | 4 | 4 | — | 3 | 4 | 4 |
|  | Solvent-based | Solution composition prepared immediately after synthesis | Film-forming characteristics Good or No good | Good | Good | Good | Good | Good | Good |
|  |  |  | Chemical resistance (10 minutes) (Good) 4 > 1 (Bad) | 4 | 4 | 4 | 3 | 4 | 4 |
|  |  |  | Chemical resistance (30 minutes) (Good) 4 > 1 (Bad) | 4 | 4 | 4 | 3 | 4 | 4 |
|  |  | Solution composition prepared after storage at 25° C. for 2 months | Film-forming characteristics Good or No good | Good | Good | Good | Good | Good | Good |
|  |  |  | Chemical resistance (10 minutes) (Good) 4 > 1 (Bad) | 4 | 4 | 4 | 3 | 4 | 4 |
|  |  |  | Chemical resistance (30 minutes) (Good) 4 > 1 (Bad) | 4 | 4 | 4 | 3 | 4 | 4 |

TABLE 3

| | | | | No. | | | | | | |
|---|---|---|---|---|---|---|---|---|---|---|
| | | | | Example 13 | Example 14 | Example 15 | Example 16 | Example 17 | Example 18 | |
| Urethane-forming step | Mixing formulation | Polyisocyanate | Type | PDI | PDI | XDI | 1,3-H6XDI | IPDI | HDI | |
| | | | Parts by mass | 100 | 100 | 100 | 100 | 100 | 100 | |
| | | Oxyethylene-containing alcohol | Type | UNIOX M400 | UNIOX M400 | UNIOX M400 | UNIOX M400 | UNIOX M400 | UNIOX M400 | |
| | | | Parts by mass | 74.1 | 34.6 | 28.3 | 27.5 | 33.0 | 31.7 | |
| | | Oxyethylene-noncontaining alcohol | Type | Isobutanol | tert-butanol | Isobutanol | Isobutanol | Isobutanol | Isobutanol | |
| | | | Sp value ((cal/cm3)^(1/2)) | 11.11 | 10.90 | 11.11 | 11.11 | 11.11 | 11.11 | |
| | | | Parts by mass | 2.3 | 9.6 | 7.9 | 7.6 | 8.1 | 8.8 | |
| | Reaction conditions | Reaction temperature | °C. | 80 | 80 | 80 | 80 | 80 | 80 | |
| | | Reaction time | | 6 | 12 | 2 | 7 | 7 | 6 | |
| Carbodiimide-forming step | Mixing formulation | Organic solvent | Type | PMA | PMA | Xylene | PMA | PMA | PMA | |
| | | | Parts by mass | 369.5 | 302.8 | 286.2 | 283.9 | 296.2 | 295.1 | |
| | | Catalyst | Type | MPPO | MPPO | MPPO | MPPO | MPPO | MPPO | |
| | | | Parts by mass | 2.0 | 2.0 | 2.0 | 2.0 | 2.0 | 2.0 | |
| | Reaction conditions | Reaction temperature | °C. | 150 | 150 | 141 | 150 | 150 | 150 | |
| | | Reaction time | | 7 | 7 | 3 | 9 | 9 | 7 | |
| Analysis | | Equivalent ratio $R_{Total}$ (NCO/OH) | | 6.0 | 6.0 | 6.0 | 6.0 | 6.0 | 6.0 | |
| | | Oxyethylene group/composition (mass %) | | 40.4 | 23.1 | 20.0 | 19.6 | 22.5 | 21.7 | |
| Storage stability | Immediately after synthesis | Type E viscosity (25° C.) | mPa·s | 1300 | 1150 | 6800 | 4200 | 5100 | 1000 | |
| | Storage at 25° C. for 2 months | Polycarbodiimide composition | mPa·s | 2800 | 4000 | 21400 | 9800 | 10500 | 2600 | |
| | Storage at 40° C. | Polycarbodiimide composition | (Good) 4 > 1 (Bad) | 3 | 2 | 1 | 3 | 3 | 3 | |
| | | Solution composition (NV40%) | (Good) 4 > 1 (Bad) | 4 | 3 | 2 | 4 | 4 | 4 | |
| Evaluation (coating 80° C.) | Water-based | Water-dispersed composition prepared immediately after synthesis | Film-forming characteristics | Good or No good | Good | Good | Good | Good | Good | Good | |
| | | | Water resistance | Good or No good | No good | Good | Good | Good | Good | Good | |
| | | | Chemical resistance (10 minutes) | (Good) 4 > 1 (Bad) | 4 | 4 | 4 | 3 | 2 | 3 | |
| | | | Chemical resistance (30 minutes) | (Good) 4 > 1 (Bad) | 4 | 4 | 4 | 3 | 3 | 4 | |
| | | Water-dispersed composition prepared after storage at 25° C. for 2 months | Film-forming characteristics | Good or No good | Good | Good | Good | Good | Good | Good | |
| | | | Water resistance | Good or No good | No good | Good | Good | Good | Good | Good | |
| | | | Chemical resistance (10 minutes) | (Good) 4 > 1 (Bad) | 4 | 4 | 4 | 3 | 2 | 3 | |
| | | | Chemical resistance (30 minutes) | (Good) 4 > 1 (Bad) | 4 | 4 | 4 | 3 | 3 | 4 | |

TABLE 3-continued

| | | | No. | | | | | |
|---|---|---|---|---|---|---|---|---|
| | | | Example 13 | Example 14 | Example 15 | Example 16 | Example 17 | Example 18 |
| Solvent-based | Solution composition prepared immediately after synthesis | Film-forming characteristics | Good | Good | Good | Good | Good | Good |
| | | Chemical resistance (10 minutes) Good or No good (Good) 4 > 1 (Bad) | 4 | 4 | 4 | 3 | 2 | 3 |
| | | Chemical resistance (30 minutes) (Good) 4 > 1 (Bad) | 4 | 4 | 4 | 3 | 3 | 4 |
| | Solution composition prepared after storage at 25° C. for 2 months | Film-forming characteristics Good or No good | Good | Good | Good | Good | Good | Good |
| | | Chemical resistance (10 minutes) (Good) 4 > 1 (Bad) | 4 | 4 | 4 | 3 | 2 | 3 |
| | | Chemical resistance (30 minutes) (Good) 4 > 1 (Bad) | 4 | 4 | 4 | 3 | 3 | 4 |

TABLE 4

| | | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Urethane-forming step | Mixing formulation | Polyisocyanate | Type | PDI | PDI | PDI | PDI | PDI | PDI | HDI |
| | | | Parts by mass | 100 | 100 | 100 | 100 | 100 | 100 | 673 |
| | | Oxyethylene-containing alcohol | Type | UNIOX M400 | UNIOX M400 | UNIOX M400 | UNIOX M400 | UNIOX M400 | UNIOX M400 | UNIOX M400 |
| | | | Parts by mass | 34.6 | 34.6 | 34.6 | 34.6 | 34.6 | 34.6 | 800.0 |
| | | Oxyethylene-noncontaining alcohol | Type | Methanol | 1-butanol | 1-methoxy-2-propanol | Cyclohexanol | Benzylalcohol | 4-methoxyphenol | — |
| | | | Sp value ((cal/cm3)^(1/2)) | 13.77 | 11.33 | 11.27 | 11.56 | 12.78 | 12.93 | — |
| | | | Parts by mass | 4.2 | 9.6 | 11.7 | 13.0 | 14.0 | 16.1 | — |
| | Reaction conditions | | °C. | 80 | 80 | 80 | 80 | 80 | 80 | 120 |
| | | | Time | 6 | 6 | 6 | 6 | 6 | 6 | 1 |
| Carbodiimide-forming step | Mixing formulation | Organic solvent | Type | PMA | PMA | PMA | PMA | PMA | PMA | — |
| | | | Parts by mass | 291.5 | 302.8 | 307.1 | 309.8 | 311.9 | 316.2 | — |
| | | Catalyst | Type | MPPO | MPPO | MPPO | MPPO | MPPO | MPPO | MPPO |
| | | | Parts by mass | 2.0 | 2.0 | 2.0 | 2.0 | 2.0 | 2.0 | 13.5 |
| | Reaction conditions | | °C. | 150 | 150 | 141 | 150 | 150 | 150 | 185.0 |
| | | | Time | 7 | 7 | 7 | 7 | 7 | 7 | Solidified by 2 hours |
| Analysis | | Equivalent ratio R_Total (NCO/OH) | | 6.0 | 6.0 | 6.0 | 6.0 | 6.0 | 6.0 | 6.0 |
| | | Oxyethylene group/composition (mass %) | | 24.0 | 23.1 | 22.8 | 22.6 | 22.4 | 22.1 | 52.3 |
| Storage stability | Immediately after synthesis | Type E viscosity (25° C.) | mPa·s | 1100 | 1100 | 1100 | 1100 | 4050 | Solidified (rubbery) | Solidified |
| | Storage at 25° C. for 2 months | Polycarbodiimide composition | mPa·s | Solidified (rubbery) | Solidified (rubbery) | Solidified (rubbery) | Solidified (rubbery) | Solidified (rubbery) | | |
| | Storage at 40° C. | Polycarbodiimide composition | Disappearance of flowability | 1 | 1 | 2 | 2 | 1 | 1 | 1 |
| | | Polycarbodiimide composition Solution composition (NV40%) | (Good) 4 > 1 (Bad) | 2 | 2 | 3 | 3 | 1 | 1 | 1 |
| Evaluation (coating 80° C.) | Water-based | Film-forming characteristics | Good or No good | Good | Good | Good | Good | Good | — | — |
| | Water-dispersed composition prepared immediately after synthesis | Water resistance | Good or No good | Good | Good | Good | Good | Good | — | — |
| | | Chemical resistance (10 minutes) | (Good) 4 > 1 (Bad) | 4 | 4 | 4 | 4 | 4 | — | — |
| | | Chemical resistance (30 minutes) | (Good) 4 > 1 (Bad) | 4 | 4 | 4 | 4 | 4 | — | — |

TABLE 4-continued

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
|  | Water-dispersed composition prepared after storage at 25° C. for 2 months | Film-forming characteristics Good or No good | — | — | — | — | — | — | — |
|  |  | Water resistance Good or No good | — | — | — | — | — | — | — |
|  |  | Chemical resistance (10 minutes) (Good) 4 > 1 (Bad) | — | — | — | — | — | — | — |
|  |  | Chemical resistance (30 minutes) (Good) 4 > 1 (Bad) | — | — | — | — | — | — | — |
| Solvent-based | Solution composition prepared immediately after synthesis | Film-forming characteristics Good or No good | Good | Good | Good | Good | Good | — | — |
|  |  | Chemical resistance (10 minutes) (Good) 4 > 1 (Bad) | 4 | 4 | 4 | 4 | 4 | — | — |
|  |  | Chemical resistance (30 minutes) (Good) 4 > 1 (Bad) | 4 | 4 | 4 | 4 | 4 | — | — |
|  | Solution composition prepared after storage at 25° C. for 2 months | Film-forming characteristics Good or No good | — | — | — | — | — | — | — |
|  |  | Chemical resistance (10 minutes) (Good) 4 > 1 (Bad) | — | — | — | — | — | — | — |
|  |  | Chemical resistance (30 minutes) (Good) 4 > 1 (Bad) | — | — | — | — | — | — | — |

While the illustrative embodiments of the present invention are provided in the above description, such is for illustrative purpose only and it is not to be construed restrictively. Modification and variation of the present invention that will be obvious to those skilled in the art is to be covered by the following claims.

INDUSTRIAL APPLICABILITY

The polycarbodiimide composition, method for producing a polycarbodiimide composition, water-dispersed composition, solution composition, resin composition, and cured resin of the present invention are suitably used in various fields such as a coating material, adhesive material (adhesive), pressure sensitive adhesive material (pressure sensitive adhesive), ink, sealant, molding material, foam and optical material, resin modifier, treatment for textile printing, and treatment for fiber.

The invention claimed is:

1. A polycarbodiimide composition of
a reaction product of polyisocyanate having a primary isocyanate group with alcohol,
wherein the alcohol contains
at least one oxyethylene-containing alcohol containing an oxyethylene group, and
at least one oxyethylene-noncontaining alcohol containing no oxyethylene group,
the at least one oxyethylene-noncontaining alcohol has a solubility parameter of 11.20 $(cal/cm^3)^{1/2}$ or less, and
the oxyethylene-noncontaining alcohol having the solubility parameter of 11.20 $(cal/cm^3)^{1/2}$ or less is
at least one selected from the group consisting of isobutanol, 2-butanol, 2-methyl-1-butanol, 2,2-dimethyl-1-propanol, 3-methoxy-1-butanol, 1-octanol, 2-ethyl-1-hexanol, and 1-dodecanol.

2. The polycarbodiimide composition according to claim 1, wherein
the oxyethylene group content relative to the polycarbodiimide composition is 10 mass % or more and 35 mass % or less.

3. The polycarbodiimide composition according to claim 1, wherein
the polyisocyanate is an aliphatic polyisocyanate.

4. The polycarbodiimide composition according to claim 1, wherein
the polyisocyanate is pentamethylene diisocyanate.

5. A method for producing a polycarbodiimide composition, the method including the steps of:
a urethane-forming step, in which polyisocyanate having a primary isocyanate group and alcohol are subjected to urethane-forming reaction, and
a carbodiimide-forming step, in which the reaction product in the urethane-forming step is heated in the presence of a carbodiimide-forming catalyst to cause carbodiimide-forming reaction,
wherein
the alcohol contains
at least one oxyethylene-containing alcohol containing an oxyethylene group, and
at least one oxyethylene-noncontaining alcohol containing no oxyethylene group,
the at least one oxyethylene-noncontaining alcohol has a solubility parameter of 11.20 $(cal/cm^3)^{1/2}$ or less, and
the oxyethylene-noncontaining alcohol having the solubility parameter of 11.20 $(cal/cm^3)^{1/2}$ or less is
at least one selected from the group consisting of isobutanol, 2-butanol, 2-methyl-1-butanol, 2,2-dimethyl-1-propanol, 3-methoxy-1-butanol, 1-octanol, 2-ethyl-1-hexanol, and 1-dodecanol.

6. The method for producing a polycarbodiimide composition according to claim 5, wherein
the equivalent ratio (NCO/OH) of the isocyanate group in the polyisocyanate relative to the hydroxyl group in the alcohol is more than 2 and 10 or less.

7. A water-dispersed composition, being
an dispersion in which the polycarbodiimide composition according to claim 1 is dispersed in water with a solid content concentration of 5 mass % or more and 90 mass % or less.

8. A solution composition, being
a solution in which the polycarbodiimide composition according to claim 1 is dissolved in an organic solvent with a solid content concentration of 5 mass % or more and 90 mass % or less.

9. A resin composition comprising
a first agent having a carboxyl group, and
a second agent containing the polycarbodiimide composition according to claim 1.

10. A cured resin, being
a cured product of the resin composition according to claim 9.

* * * * *